Patented Sept. 4, 1934

1,972,094

UNITED STATES PATENT OFFICE 1,972,094

DYES OF THE ANTHRAQUINONYL-AMINO ANTHRAQUINONE-ACRIDONE SERIES AND THEIR PRODUCTION

Robert J. Goodrich and Ivan Gubelmann, South Milwaukee, Wis., assignors to E. I. du Pont de Nemours & Company, Wilmington, Del., a corporation of Delaware No Drawing. Application November 16, 1931, Serial No. 575,477

14 Claims. (Cl. 260—37)

This invention relates to novel dyestuffs of the anthraquinone-acridone series. More particularly, it is an object of this invention to produce novel and useful intermediates and coloring matters from highly halogenated anthraquinone-diacridones.

In copending application, Serial No. 575,476, filed of even date herewith, we have disclosed a process of producing halogenated anthraquinone-diacridones, containing a high total amount of halogen (over 4 atoms per molecule), and containing apparently some halogen in the α-positions of the anthraquinone nucleus. Among other compounds thus produced, the following two were mentioned:

Bz,Bz-tetrachloro-4,8-dichloro - 1,2,5,6 - anthraquinone-diacridone (Formula I), Bz,Bz -tetrachloro-4,5-dichloro - 1,2,8,7 - anthraquinone-diacridone (Formula II).

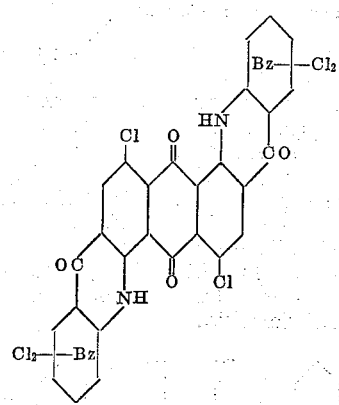

(I)

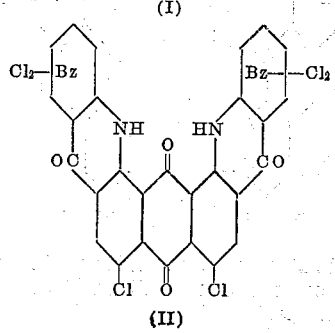

(II)

We have now found that these halogenated bodies may be transformed into valuable compounds by condensing them with amino-anthraquinone bodies to produce novel anthraquinone-imino compounds.

These novel compounds correspond most probably to the general formula:

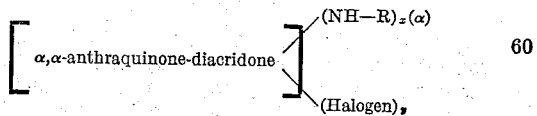

wherein the letters α refer to the positions of the various nitrogen atoms, both of the heterocyclic ring and of the group NH—R, with respect to the central anthraquinone nucleus, R represents a radical of the anthraquinone series, $x$ stands for 1 or 2, while $y$ stands for a number not less than 4.

The novel compounds possess valuable dyeing qualities. They are, however, more useful as intermediates for another series of dyestuffs obtainable by condensing said novel anthraquinone-imines with metallic halides, as more particularly set forth in copending application Serial No. 575,478.

Without limiting our invention to any specific procedure, the following examples are given to illustrate the preferred mode of preparing our novel intermediates and dyestuffs. Parts given are parts by weight.

Example 1

25 parts of hexachloro-1,2,8,7-anthraquinone-diacridone (Formula I) are suspended in 500 parts of nitrobenzene and 18 parts of α-amino-anthraquinone, 2 parts of cuprous chloride and 10 parts of soda ash are added. The mixture is heated to about 200 to 210° C., and held at this temperature for about 16 hours. It is now cooled to room temperature, filtered, and washed first with 100 parts of nitrobenzene, then with alcohol, and finally with water until free of inorganic salts. The product when dry is a bluish black powder, soluble in concentrated sulfuric acid with a cherry red color, which changes to an olive black precipitate on dilution of the acid with water. It is insoluble in water, dilute acids or dilute alkalis. It is somewhat soluble in warm nitrobenzene, imparting thereto a bluish-violet color. It is somewhat soluble with a violet color in the sodium-hydrosulfite vat, from which cotton may be dyed a violet color which turns to a reddish grey upon oxidation in known manner.

The constitution of the product probably corresponds to the chemical formula,

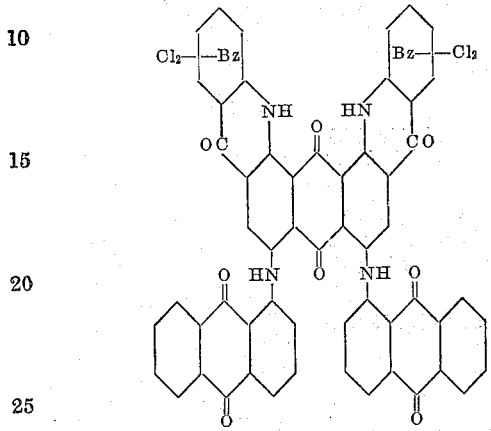

which may be termed a halogenated di(α-anthraquinonylimino)-α,α - anthraquinone - diacridone, or more particularly, Bz, Bz-tetrachloro-4,5-di-(α-anthraquinonylimino)-1,2,8,7-anthraquinone-diacridone.

Example 2

The procedure is the same as in Example 1, except that, in lieu of starting with the 1,2,8,7-isomer therein mentioned, here the 1,2,5,6-isomer is used (Formula I). The product when dry is a bluish-black powder, insoluble in water, dilute acids or dilute alkalis. It is soluble in concentrated sulfuric acid with a red color, but precipitates in the form of blackish flocks on dilution of the acid with water. It is somewhat soluble in warm nitrobenzene, imparting thereto a violet color. It is readily soluble in the sodium-hydrosulfite vat, from which cotton may be dyed a violet color changing upon oxidation to a reddish-grey shade.

The constitution of this product is probably isomeric with that of Example 1. In other words, it is probably a halogenated di(α-anthraquinonylimino)- α,α - anthraquinonediacridone, or more particularly, Bz,Bz-tetrachloro-4,8-di(α-anthraquinonylimino)1,2,5,6-anthraquinone-diacridone.

Example 3

If, instead of the hexachloro-1,2,5,6-anthraquinone-diacridone, the corresponding pentachloro compound is used, the remaining procedure being the same as in Example 2, a product of similar properties is obtained.

Example 4

25 parts of hexachloro-1,2,8,7-anthraquinone-diacridone (Formula II) are suspended in 500 parts of nitrobenzene, and 27 parts of 1-amino-5-benzoylamino-anthraquinone are added, as well as 2 parts of cuprous chloride and 10 parts of soda ash. The mixture is now heated at about 200 to 210° C. for about 16 hours, and then further treated to isolate the reaction product, according to the procedure set forth in Example 1. The product dissolves in concentrated sulfuric acid with a red brown color, and is somewhat soluble in the usual sodium-hydrosulfite vat with a dull violet color, from which cotton may be dyed in grey shades. The product is probably a halogenated dibenzoylimino-di(α-anthraquinonylimino)-anthraquinone-diacridone of the formula:

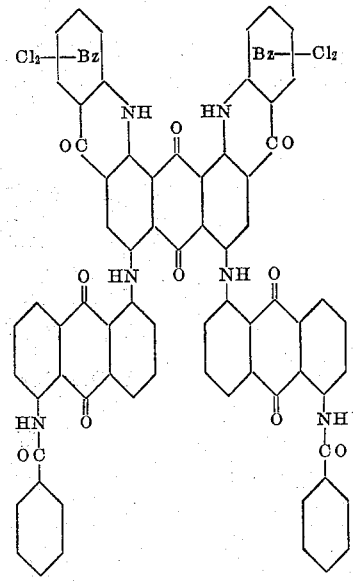

It will be understood that many variations are possible in our procedure, without departing from the spirit of the same.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. An anthraquinone-acridone compound of the general formula:

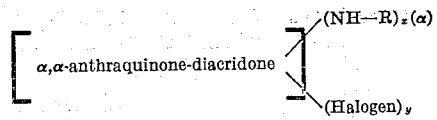

wherein R represents a radical of the anthraquinone series, x stands for 1 or 2, while y stands for a number not less than 4.

2. Tetra-halogenated α-anthraquinonylimino-vis-a-vis-α,α-anthraquinone-diacridone.

3. A Bz,Bz-tetrachloro-di(α-anthraquinonylimino)-α,α-anthraquinone-diacridone.

4. A tetrachloro-bisanthraquinonylimino-anthraquinone-diacridone compound of the following general formula:

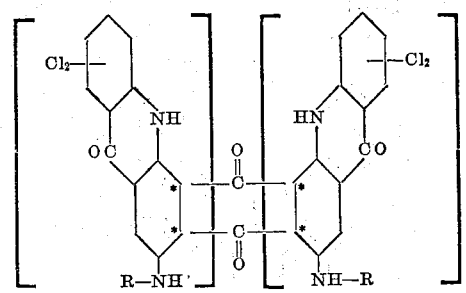

wherein R stands for an anthraquinonyl radical, while ** indicate the positions of attachment of the CO groups.

5. A compound of the following general formula:

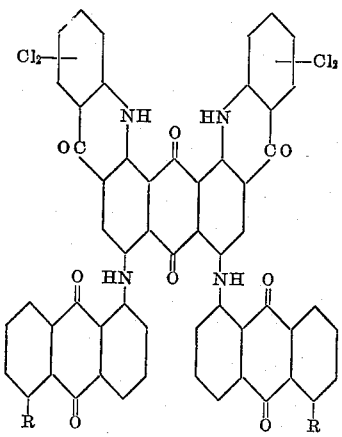

wherein R stands for either hydrogen or an aroyl-amino group of the benzene series.

6. A compound of the following general formula:

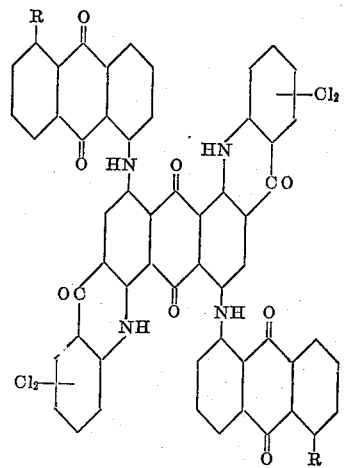

wherein R stands for hydrogen or an aroyl-amino group of the benzene series.

7. The process of producing a halogenated anthraquinonyl-imino-anthraquinone-diacridone which comprises reacting a polyhalogen-α,α-anthraquinone-diacridone containing more than 4 halogen atoms with an α-amino-anthraquinone in the presence of amidation catalysts and acid binding agents.

8. The process of producing a chlorinated anthraquinonyl-imino-anthraquinone-diacridone which comprises reacting a polychloro-α,α-anthraquinone-diacridone containing more than 4 atoms of chlorine per molecule with an α-amino-anthraquinone in the presence of amidation catalysts and acid binding agents.

9. The process of producing a chlorinated anthraquinonylimino-anthraquinone-diacridone which comprises reacting a hexachloro-α,α-anthraquinone-diacridone with an α-amino-anthraquinone body in the presence of amidation catalysts and acid binding agents.

10. The process of producing a chlorinated anthraquinonylimino-anthraquinone-diacridone which comprises reacting a Bz,Bz-tetrachloro-α,α-dichloro-anthraquinone-diacridone with an α-amino-anthraquinone in the presence of amidation catalysts and acid binding agents.

11. The process of producing a dyestuff compound which comprises reacting Bz,Bz-tetrachloro-4,8-dichloro-1,2,5,6-anthraquinone-diacridone, in the presence of amidation catalysts and acid absorbing agents, with an α-amino-anthraquinone.

12. The process of producing a dyestuff compound which comprises reacting Bz,Bz-tetrachloro-4,5-dichloro-1,2,8,7-anthraquinone-diacridone, in the presence of amidation catalysts and acid absorbing agents, with an α-amino-anthraquinone.

13. The process of producing a dyestuff compound which comprises heating substantially 25 parts of hexachloro-1,2,8,7-anthraquinone-diacridone with substantially 18 parts of α-amino-anthraquinone in a medium of nitrobenzene and in the presence of cuprous chloride and sodium carbonate at a temperature of 200 to 210° C. for several hours, cooling the reaction mass and recovering the dyestuff compound formed.

14. The process of producing a dyestuff compound which comprises heating substantially 25 parts of hexachloro-1,2,5,6-anthraquinone-diacridone with substantially 18 parts of α-amino-anthraquinone in a medium of nitrobenzene and in the presence of cuprous chloride and sodium carbonate at a temperature of 200 to 210° C. for several hours, cooling the reaction mass and recovering the dyestuff compound formed.

ROBERT J. GOODRICH.
IVAN GUBELMANN.